US012188643B1

(12) United States Patent
Dillard

(10) Patent No.: US 12,188,643 B1
(45) Date of Patent: Jan. 7, 2025

(54) MOTION-ACTIVATED LIGHT WITH EXTENDIBLE LIGHTING MEMBERS

(71) Applicant: Bernard Dillard, New York, NY (US)

(72) Inventor: Bernard Dillard, New York, NY (US)

( * ) Notice: Subject to any disclaimer, the term of this patent is extended or adjusted under 35 U.S.C. 154(b) by 0 days.

(21) Appl. No.: 18/423,826

(22) Filed: Jan. 26, 2024

(51) Int. Cl.
*F21V 21/32* (2006.01)
*F21V 23/04* (2006.01)

(52) U.S. Cl.
CPC .......... *F21V 21/32* (2013.01); *F21V 23/0471* (2013.01)

(58) Field of Classification Search
CPC ............................. F21V 21/32; F21V 23/0471
See application file for complete search history.

(56) References Cited

U.S. PATENT DOCUMENTS 3,962,678 A * 6/1976 Kurokawa .............. F21S 6/003 362/413
6,175,309 B1 * 1/2001 Drake .................. G08B 13/193 340/693.11
6,523,970 B1 * 2/2003 Scales, III .............. F21S 8/037 439/643
7,316,489 B2 1/2008 Chou
7,810,945 B2 * 10/2010 Mize ...................... H01R 33/94 439/642
10,107,480 B1 * 10/2018 Ladewig ................ F21S 8/036
11,415,298 B1 8/2022 Rodvold
2004/0246723 A1 * 12/2004 Graves ............... F21V 23/0442 362/276
2013/0201702 A1 * 8/2013 Wallon .................... F21V 23/06 362/418
2016/0330825 A1 * 11/2016 Recker ................. H05B 47/115

* cited by examiner

*Primary Examiner* — Evan P Dzierzynski
(74) *Attorney, Agent, or Firm* — Sanchelima & Associates, P.A.; Jesus Sanchelima; Christian Sanchelima

(57) ABSTRACT

A including a, an extendible neck assembly, a light member assembly and a motion sensor. The base member assembly includes a fixture base. The base can be attached to a predetermined surface. The extendible neck assembly connects the light member assembly and the base member assembly. The light member assembly includes at least one light. The extendible neck assembly is operated to modify the position of at least one light. The motion sensor detects motion to selectively turn on said at least one light.

1 Claim, 4 Drawing Sheets

MOTION-ACTIVATED LIGHT WITH EXTENDIBLE LIGHTING MEMBERS

BACKGROUND OF THE INVENTION

1. Field of the Invention

The present invention relates to motion-activated light with extendable lighting members and, more particularly, to motion-activated light with extendable lighting members that include an extendible neck member that allows maneuvering and repositioning light members.

2. Description of the Related Art

Several designs for motion sensor lights have been designed in the past. None of them, however, include a base adapted to be attached to a wall, the base having at least one light member attached thereto by means of an extensible neck member.

Applicant believes that a related reference corresponds to U.S. Pat. No. 11,415,298 issued for a light fixture with an actuator mechanism that allows the light to move between a retracted and extended portion. The applicant believes another related reference corresponds to U.S. Pat. No. 7,316,489 issued for a lighting fixture with a plurality of below expansion joints. None of these references, however, teach of a motion-activated light with extendable lighting members that is comprised of an outdoor light fixture with a motion sensor and a pair of lighting elements that are connected to the light fixture base with a flexible bellows-like conduit which allows the lighting elements to be extended and moved to a position away from the fixture base.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a motion-activated light with extendable lighting members that includes a motion sensor embedded in the base or in the light housing.

It is another object of this invention to provide motion-activated light with extendable lighting members that include an extensible neck with an accordion-like external shell that extends the extensible neck.

It is still another object of the present invention to provide a motion-activated light with extendable lighting members which is easy to install and maneuver to light and sense motion selectively.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
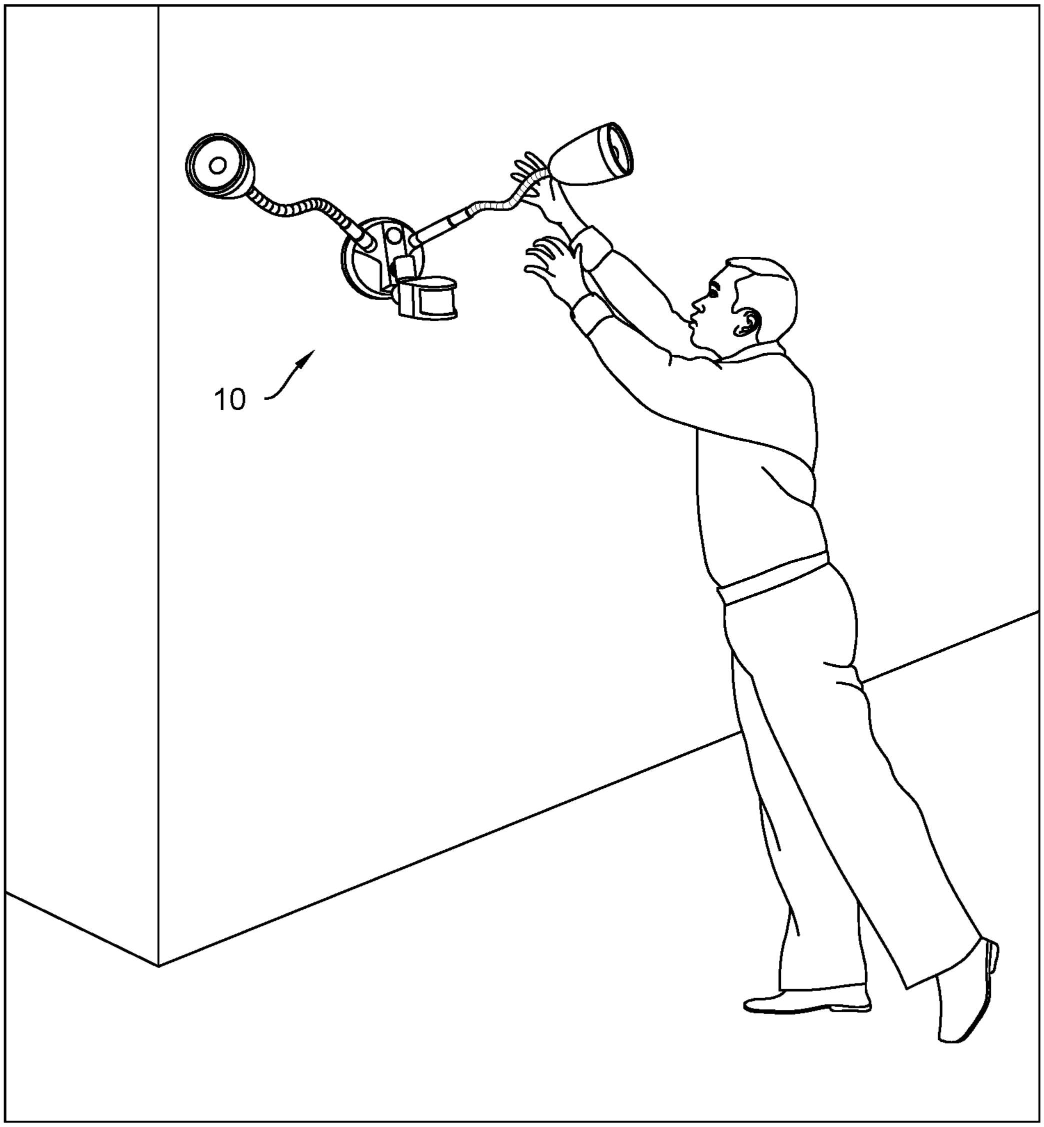
FIG. 1-1A represents an isometric operational view of the present invention 10 of a user adjusting one of the light housing 62.
Figure 1A:
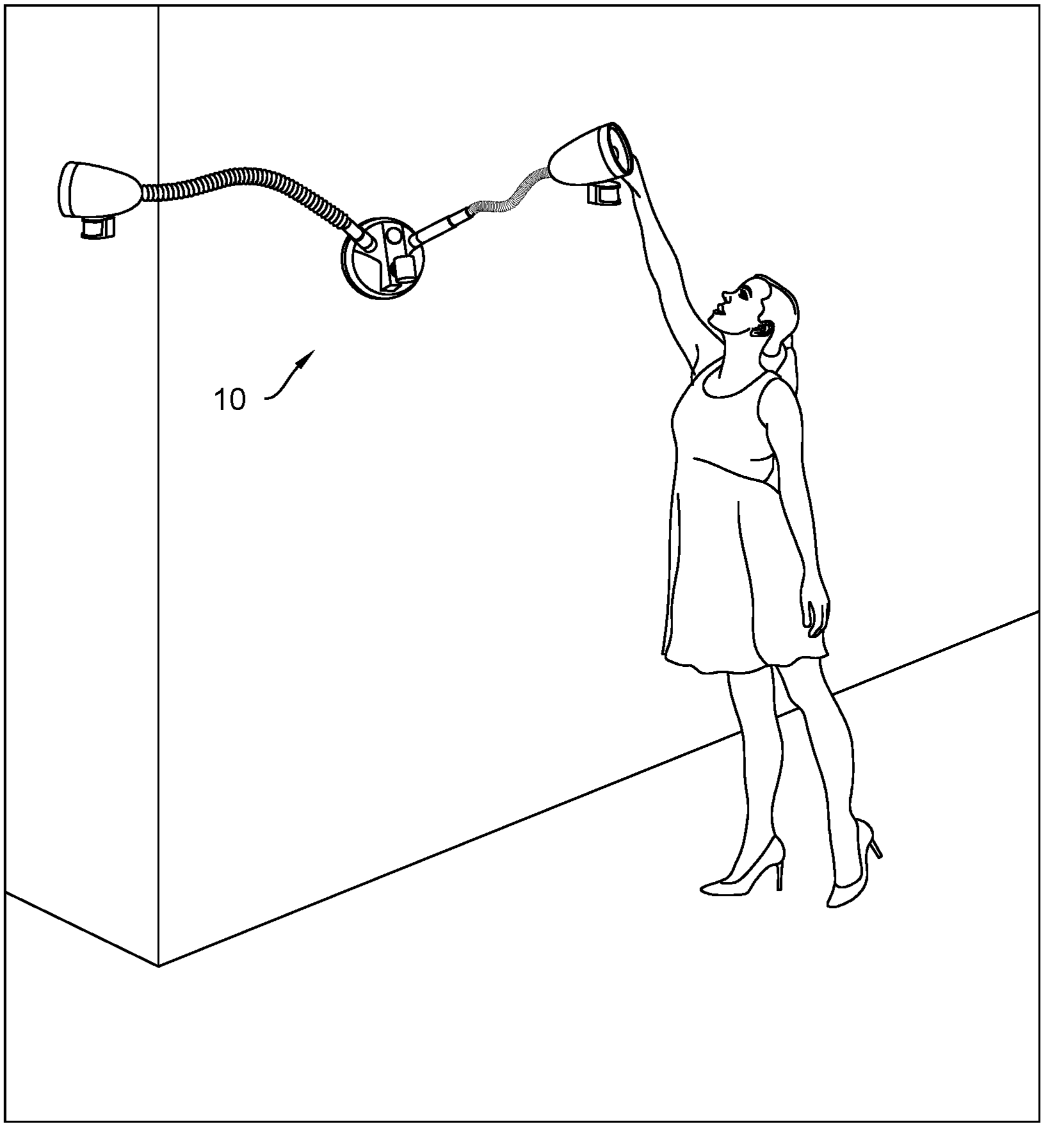

Referring now to the drawings, where the present invention is generally referred to with numeral 10, it can be observed that it basically includes a base member assembly 20, an extendible neck assembly 40, and light member assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
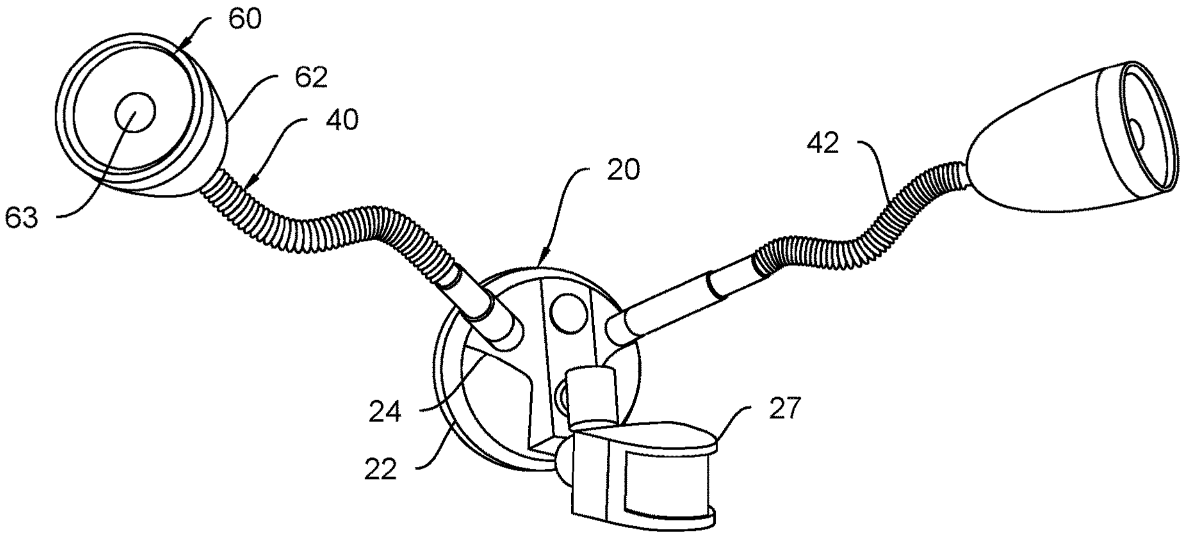
FIG. 2 shows an isometric view of a first embodiment of the present invention 10 in a first exemplary configuration for the light member assembly 60. The present invention 10 includes a base member assembly 20, an extendible neck assembly 40, and a light member assembly 60.

The base member assembly 20 includes a fixture base 22, fasteners 24, and at least one motion sensor 27. As depicted in FIG. 1, the base member assembly 20 the support of the invention. The base member assembly 20 may be made of a resistant, durable, and sturdy material. In different embodiments, the fixture base 22 may be made of polymers, metal alloys, wood, ceramics, fibers, or any other material known in the art. The fixture base 22 may have a circular geometry, as depicted throughout FIGS. 1-2A. The fixture base 22 may be hollow to enclose additional elements such as wiring, circuitry, or the like. In order to mount the fixture base 22 onto a surface, such as a wall, fasteners 24 may be used in conventional fashion. The fasteners 24 may be one of a group comprising screws, nails, wall anchors, lap clips, adhesive strips, hook and loop fasteners, picture hangers, or any other suitable variation as known in the art. The at least one motion sensor 27 may be attached to a front surface of the fixture base 22 as depicted in FIG. 2. Incorporating the fixture base 22 on the front surface of the fixture base 22 enhances its functionality by enabling responsive activation and deactivation based on detected movement in the surrounding environment. The motion sensor, also known as a motion detector, is an electronic device designed to detect movement in its surrounding environment. It operates by recognizing changes in the infrared radiation or other environmental factors caused by the motion of objects or living beings within its sensing range. In different embodiments, the at least one motion sensor 27 may be one of a group comprising; an IR motion sensor, a microwave motion sensor, an ultrasonic sensor, a passive infrared motion sensor, or any other suitable sensor from the art.

The extendible neck assembly 40 includes a flexible bellow-like conduit 42 which houses a cable 44. The bellow-like conduit 42 is typically made of aluminum, ceramics, fibers, plastics, or the like. The bellow-like conduit 42 has a corrugated body that allows it to adjust its length. For instance, in FIG. 2, the bellow-like conduit 42 may have accordion pleats to mirror said corrugated body. The bellow-like conduit 42 has two distal ends. A proximal end thereof is operatively connected to the fixture base 22 as depicted in FIG. 1; whereas a distal end of the bellow-like conduit 42 connects to a light housing 62 of the light member assembly 60. A plurality of the extendible neck assembly 40 can be connected to the fixture base 22 as shown throughout FIG. 1-2A, wherein two extendible necks are mounted on the fixture base 22. As showcased in FIG. 2, each bellow-like conduit 42 may be located proximal to the periphery of the fixture base 22. It should be understood that the number of extendible neck assembly 40 attached to the fixture base 22 and the location of each bellow-like conduit 42 may vary depending on the user's requirements. Depicted in FIG. 2B, the bellow-like conduit 42 is shown in both extended and contracted configurations. The foregoing enables the bellow-like conduit 42 to be manipulated as desired by the user.

Figure 2A:
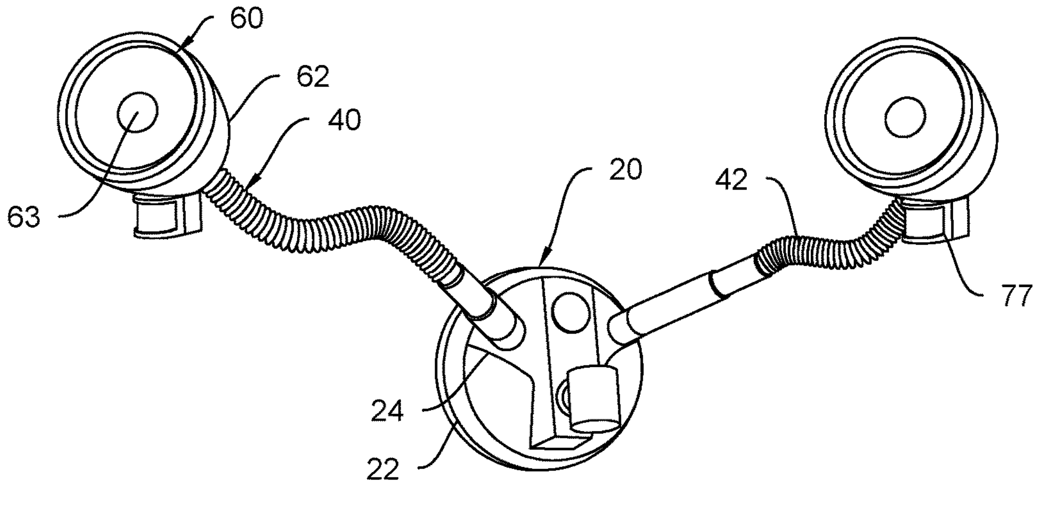
FIG. 2A depicts an isometric view of a second embodiment of the present invention 10 in a second exemplary configuration for the light member assembly 60.
Figure 2B:
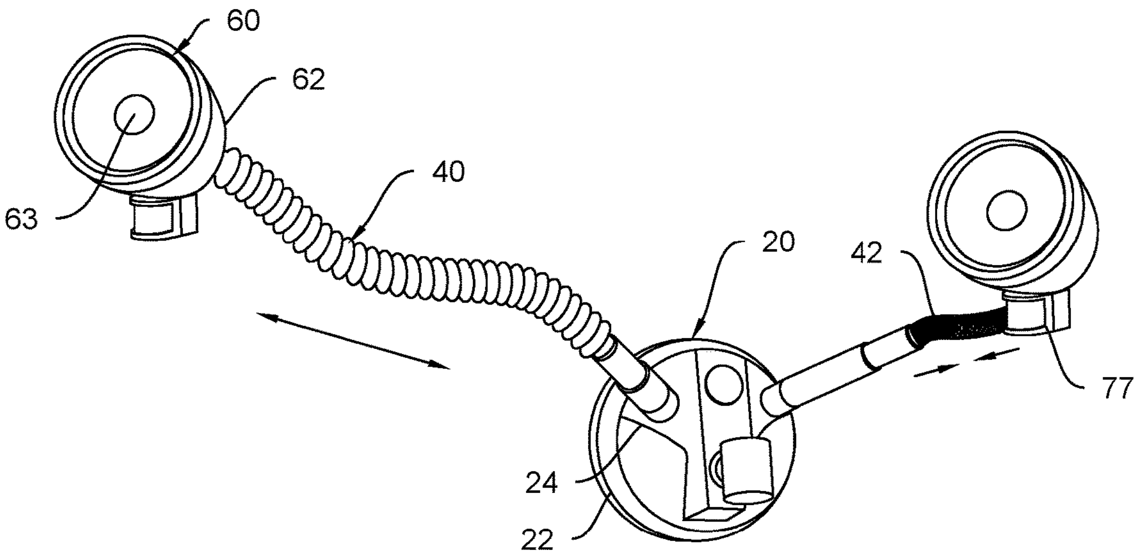
FIG. 2B showcases an isometric view of the invention where the bellow-like conduit 42 is in extended and contracted configurations.
Figure 3:
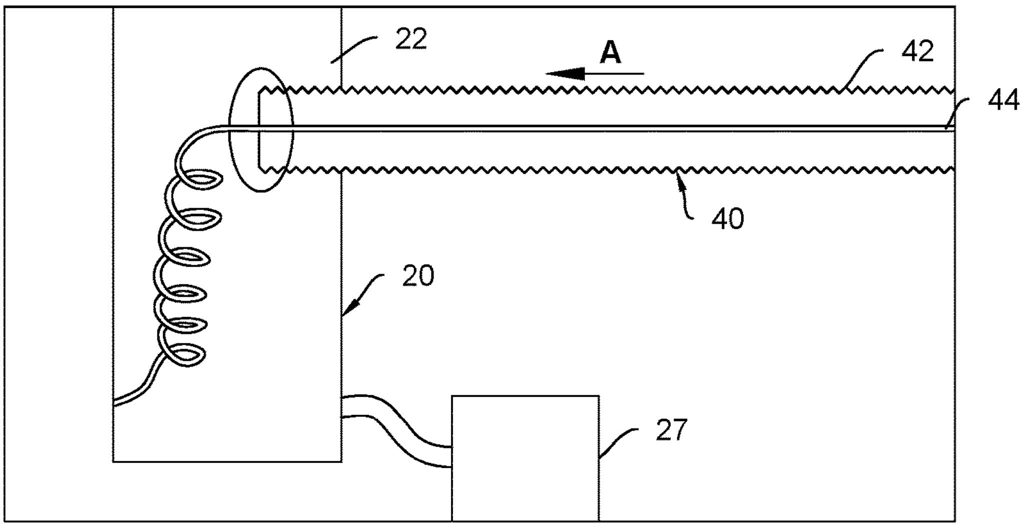
FIG. 3 illustrates a schematic see-through view of the extendible neck assembly 40 connected to the base member assembly 20.

The light member assembly 60 includes a light housing 62 and a light source 63. The light housing 62 is volumetrically suitable to enclose the light source 63. In one embodiment, the light housing 62 may have a U-shape. Alternatively, the light housing 62 may have a tapered shape, wherein a bottom end is smaller than a top end. The light housing 62 may be made of a lightweight material. As depicted in FIG. 1-2A, the distal end of the bellow-like conduit 42 is connected to the bottom end of the light housing 62. The light housing 62 may have an open top which may be covered by a transparent film, glass, or the like. The light source 63 may be partially enclosed by the light housing 62 inasmuch as light emitted by the light source 63 is visible. The light source 63 may be electrically connected to the cable 44. In an alternative embodiment, the at least one motion sensor 27 may not be mounted on the fixture base 22, but may be formed in the light housing 62, defining a light embedded motion sensor 77. The number of light member assembly 60 is related to the number of extendible neck assembly 40 attached to the base member assembly 20. The bellow-like conduit 42 enables the user to change the position of the extendible neck assembly 40 relative to the fixture base 22. In that direction, a user may be able to adjust the location of the extendible neck assembly 40 away from the fixture base 22. When the at least one motion sensor 27 senses movement within its range, it sends an electric signal that actuates the light source 63. It should be noted that a light source 63 electrically connected to a at least one motion sensor 27 is widely known in the art, therefore, such electric connection has not been described in detail as it is known to a skilled artisan.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A motion-activated light with extendable lighting members, consisting of:
- a base member assembly including a fixture base capable of being attached to a predetermined surface by means of fasteners;
- an extendible neck assembly, including:
  - a bellow-like conduit having a corrugated body that allows to adjust its length, said bellow-like conduit having a proximal end and a distal end;
- a light member assembly, including:
  - a U-shaped light housing being open at a top end;
  - a light source housed by the light housing, said light housed being electrically connected to a motion sensor;
  - wherein the proximal end of the bellow-like conduit is connected to the fixture base, the distal end of the bellow-like conduit is connected to a bottom end of the light housing;
- wherein a pair of the extendible neck assemblies and the light member assemblies are mounted on the fixture base, proximal to a periphery of the fixture base;
- wherein said motion sensor actuates said light source;
- wherein said bellow-like conduit, being flexible, allows the light member assembly to be extended and moved to a position away from the fixture base.

* * * * *